(12) United States Patent
McKnight et al.

(10) Patent No.: US 7,761,788 B1
(45) Date of Patent: Jul. 20, 2010

(54) SYSTEM AND METHOD FOR CAPTURING DOCUMENT STYLE BY EXAMPLE

(75) Inventors: David K. McKnight, Toronto (CA); Eduardus A. T. Merks, North York (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/489,793

(22) Filed: Jan. 24, 2000

(30) Foreign Application Priority Data

Oct. 15, 1999  (CA) .................................. 2285877

(51) Int. Cl.
    G06F 17/21 (2006.01)
(52) U.S. Cl. .................. 715/248; 715/200; 715/209; 715/243; 715/273; 715/276
(58) Field of Classification Search .................. 715/517, 715/500, 519, 200, 209, 243, 248, 273, 276; 707/10
    See application file for complete search history.

(56) References Cited

U.S. PATENT DOCUMENTS

| | | | |
|---|---|---|---|
| 5,276,155 A | 1/1994 | Medich et al. ............... 546/233 |
| 5,283,887 A | 2/1994 | Zachery ....................... 395/500 |
| 5,313,394 A | 5/1994 | Clapp ...................... 364/419.1 |
| 5,317,646 A | 5/1994 | Sang, Jr. et al. ................ 382/9 |
| 5,381,523 A | 1/1995 | Hayashi ....................... 395/145 |
| 5,461,710 A | 10/1995 | Bloomfield et al. ......... 395/161 |
| 5,555,101 A | 9/1996 | Larsson et al. .............. 358/403 |
| 5,629,846 A | 5/1997 | Crapo ......................... 395/785 |
| 5,669,007 A * | 9/1997 | Tateishi ...................... 715/517 |
| 5,701,500 A | 12/1997 | Ikeo et al. .................... 395/779 |
| 5,799,325 A | 8/1998 | Rivette et al. ............... 707/500 |
| 5,857,212 A * | 1/1999 | Van De Vanter ............ 715/519 |

(Continued)

FOREIGN PATENT DOCUMENTS

JP         07-093329         4/1995

(Continued)

OTHER PUBLICATIONS

Microsoft Word 97, 1996 Microsoft Corporation, screenshots pp. 1-16.*

(Continued)

*Primary Examiner*—Joshua D Campbell
(74) *Attorney, Agent, or Firm*—Winstead, P.C.

(57) ABSTRACT

A system and method of using an example document to create another document with the same style. The style is determined by examining the example file for syntax patterns that are required in a document of this type. Each pattern is used to create a section template (a sub-template for a larger template). After all the required sub-templates have been defined, by examining the example, we have a document template that may be used to format new documents. Along with user-specific content, a document generator uses the captured document template to generate sections of a new document. When a section of a document is generated, the sub-template that corresponds to that section of a document is inserted with user-specific content. The generated file ends up with the same kind of text spacing and positioning, ordering of sections, presence of annotations and other nonfunctional attributes as the example.

3 Claims, 5 Drawing Sheets

U.S. PATENT DOCUMENTS 5,860,073 A    1/1999  Ferrel et al. .................. 707/522
5,983,227 A * 11/1999  Nazem et al. .................. 707/10
6,223,191 B1 * 4/2001  Truelson ..................... 715/517

FOREIGN PATENT DOCUMENTS

| JP | 08-235284 | 9/1996 |
|----|-----------|--------|
| JP | 09-114827 | 5/1997 |
| JP | 10-040238 | 2/1998 |
| WO | WO 99/08205 | 2/1999 |

OTHER PUBLICATIONS

Turbo C++ Version 4.5, 1995 Borland Interneational, screenshots pp. 1-7.*

Office Action for U.S. Appl. No. 12/180,525 dated Jun. 25, 2009.

* cited by examiner

Figure 2

Class SmartGuide

DECLARATIONS

Here are the declarations that will be generated for you.
You can go back if you have any changes to make.

File to write to:

| D:\tests\new\FrameWindow.hpp | Browse ... | Edit Style ... |

```
//////////////////////////////////
//
//    MyFrameWindow
//
//////////////////////////////////
class MyFrameWindow : public IFrameWindow
    , public IFrameHandler
    , public ICommandHandler
    , public IMenuHandler
{
public:
    MyFrameWindow();
    IColor backgroundColor() const;
    int get_aVariable();
    void set_aVariable(int value);

protected:
    IWindowHandle create (unsigned long id, const char * title
```

NAVIGATE

| BACK | NEXT | OK | CANCEL | HELP |

SYSTEM AND METHOD FOR CAPTURING DOCUMENT STYLE BY EXAMPLE

BACKGROUND OF THE INVENTION

1. Technical Field of the Invention

This invention pertains to the formatting of documents. More particularly, it relates to the generation of output documents having nonfunctional aspects presented in the style of a user supplied example.

2. Background Art

There are many tools that generate documents. These tools are useful because they automate tasks that would otherwise be time-consuming and menial for a user. Examples of these tools are conversion utilities (where one document form is transformed into another), source code generators or any other program that has as its output some kind of text document. If the task is well-defined then these programs are very effective in providing a desired result at the functional level.

The problem is that there is often some aspect of the task that can't be defined in a procedural kind of way. For example, if a user uses a code generation tool, a syntactically and semantically correct piece of source code may result as output, but that output may not have the desired style. Style, in this case, refers to such things as how lines are indented, the order in which to put certain sections of a document, whether and how to put comments before certain lines, and so forth. There is no one "correct" style for most documents so there can be no deterministic way to generate the perfect document for all users. Users have their own preferences for these nonfunctional output conditions. Despite the fact that these things are nonfunctional, users tend to be very committed to them. Consequently, such style preferences result in users choosing not to use the tools which do not accommodate their preference.

It would thus be advantageous to provide an improved system and method for formatting output documents, particularly for formatting output documents in a style preferred by a user.

It would also be advantageous to provide a system and method enabling a user to specify by example the style of an output document, particularly specifying by example the nonfunctional aspects, including text element position, annotations, alignment offsets, and document section order, to be applied to the functional aspects of an output document.

SUMMARY OF THE INVENTION

In accordance with the present invention, there is provided a system and method for formatting an output document in accordance with a style presented by a user in an example document. The input document is examined to determine document style and to generate therefrom corresponding style templates and, selectively, alignment offsets and section order, for use in formatting functional aspects of an output document.

In accordance with an aspect of the invention, there is provided a computer program product configured to be operable to format the functional aspects of an output document in a style specified by a user in an example input document.

There is provided a method for formatting a document, comprising the steps of receiving a user example and formatting the non-functional aspects of said document in the style of said user example. Said method is also provided wherein said non-functional aspects include indentation, order, and comment style. There is also provided a method for formatting an output document, comprising the steps of receiving from a user an example document; selectively generating from said example document style templates, alignment offsets and section order; and responsive to said templates, offsets and order, formatting functional aspects of said output document.

Also provided is a method for generating an output document in a user preferred style, comprising the steps of capturing the user preferred style from a user example document; and generating a plurality of templates, each said template representing a component of said user example document and selectively including replaceable macros. Said method may also comprise the steps of generating functional aspects; replacing said macros in said template with information from said functional aspects; and responsive to said template with information from said functional aspects, generating said output document. Said methods may also comprise the step of applying syntactical patterns to said user example document to define said component and optionally the step temporarily removing comments from said user example document when applying said syntactical patterns to said user example document. Said output document in the above methods may also include a plurality of separately generated sections. And, the above methods may further comprise the steps of determining from said user example document a user preference for group order; and generating said output document with public, protected, and private member access in said user preference order. The methods may further comprise the step of receiving from said user further input changing the style of said user example document. And, the methods may be provided wherein said replaceable macros correspond to text in said user example document.

A method for generating an output document with indentation of document components in a user preferred style is also provided comprising the steps of receiving a user example document; while parsing document components in said user example document, preserving the relative indentation of subcomponents by calculating user desired offsets for said subcomponents; and responsive to said user desired offsets, generating said output document. Said user desired offsets may be preserved for variables, functions, and constructors.

There is also provided a method for generating an output document in a user preferred style, comprising the steps of reading an example file representing said user preferred style into an input buffer; searching said input buffer for a pattern that matches that of an expected section; if said pattern is found, from the position of said pattern, defining a first bound by searching backwards in said buffer until a previous expected search pattern is found; from the position of said pattern, defining a second bound by searching forwards in said buffer until a next expected search pattern is found; copying a string of characters contained within said input buffer between said first bound and said second bound to a template buffer; parsing said template buffer to isolate expected keywords, and names and subsections; if said expected section is a section that can be repeated in a document, saving in said template buffer the line offsets of keywords, names and other elements; replacing content-specific subsections with macro names; and if said pattern is not found, creating a default template buffer for said expected section. The method may also further comprise the steps of getting a said template buffer for each section to be generated in said output document; getting user content for all sections of said output document; creating an output buffer for storing said output document; for each section of said output document, putting a corresponding template buffer into a temporary output buffer; replacing macro names in said temporary output buffer with user content information; if this section is expected to be repeated and the user desires alignment, using corresponding template offsets to modify said temporary output buffer for aligning keywords, names, and other sub-sections; inserting the content of said temporary output buffer into said output buffer; and writing said output buffer to a file.

Also provided is a computer program product for generating an output document in a user preferred style, said computer program product comprising a style capture tool for examining an input document containing an example of said user preferred style to determine said user preferred style for non-functional aspects of said output document; a code generation tool for generating functional aspects of said output document; and a document generate tool responsive to said style capture tool and said code generation tool for generating said output document with said preferred style for non-functional aspects applied to the presentation of said functional aspects. The above computer program product may further comprise a grammar template for storing syntax rules; and said style capture tool being responsive to said syntax rules for pattern-matching said user example document. The computer program products may further comprise a plurality of grammar templates, each said template for storing syntax rules for a unique one of a plurality of programming languages. Optionally, the computer program products may include a plurality of input document files, each said input document file representing a user preferred style for different parts of said output document. Said input document files may include a declaration example file and a definition example file. And the computer program products may also be provided wherein said code generation tool is operable for generating class declarations, and said style capture tool is operable for providing to said document generate tool rules for syntax and ordering of class-head, base-specifiers, class body, access-specifiers, and member-declarations.

There is further provided a computer program product for generating an output document, said computer program product comprising at least one grammar template file, one said grammar template file for each of one or more sections of an output document in one or more programming languages, each said grammar template file for specifying the manner for parsing and defining the bounds of a section of said output document; and at least one style template parsed from a user example document in a user preferred style using said grammar template file for defining the style of a section of said output document. The computer program product may further comprise a syntax template for finding and extracting style information for each section of said user example document and including a section identifier, an external pattern, an internal pattern, a before pattern, an after pattern, a repeatability indicator, and an ordering indicator; each said syntax template being associated with a single style template; said section identifier for identifying a section of said output document; said external pattern for finding a particular section in said input document; said internal pattern for indicating the textual elements to be considered as part of said particular section; said before pattern for indicating what should come before said particular section; said after pattern for indicating what should come after said particular section; said repeatability indicator for indicating whether said particular section is a repeatable section and, if so, that alignment offsets need to be calculated; and said ordering indicator for indicating if said particular section is part of a group of unique sections and, if so, whether the ordering of said group of unique sections is independent or whether the ordering of said group must be captured from said user example document.

Further provided is a computer program product for formatting a document, said computer program product comprising instruction means for receiving a user example; and instruction means for formatting the non-functional aspects of said document in the style of said user example. The computer program product may also be provided wherein said non-functional aspects include indentation, order, and comment style.

A computer program product for formatting documents is also provided, said computer program product comprising instruction means for receiving from a user an example document; instruction means for selectively generating from said example document style templates, alignment offsets and section order; and instruction means for, responsive to said templates, offsets and order, formatting functional aspects of said output document.

Also, a computer program product for generating an output document in a user preferred style is provided, said computer program product comprising instruction means for capturing the user preferred style from a user example document; and instruction means for generating a plurality of templates, each said template representing a component of said user example document and selectively including replaceable macros. The computer program product may further comprise instruction means for generating functional aspects; instruction means for replacing said macros in said template with information from said functional aspects; and instruction means for, responsive to said template with information from said functional aspects, generating said output document. The computer program products may further comprise instruction means for applying syntactical patterns to said user example document to define said component. And, the computer program products may further comprise the step of instruction means for temporarily removing comments from said user example document when applying said syntactical patterns to said user example document. The computer program products may also be provided wherein said output document include a plurality of separately generated sections. The computer products may also further comprise instruction means for determining from said user example document a user preference for group order; and instruction means for generating said output document with public, protected, and private member access in said user preference order. Also provided are the computer program products further comprising instruction means for receiving from said user further input changing the style of said user example document. And the computer program products may be provided wherein said replaceable macros correspond to text in said user example document.

There is further provided a computer program product for generating an output document with indentation of document components in a user preferred style, said computer program product comprising instruction means for receiving a user example document; instruction means for, while parsing document components in said user example document, preserving the relative indentation of subcomponents by calculating user desired offsets for said subcomponents; and instruction means for, responsive to said user desired offsets, generating said output document. The computer program product is also provided wherein said user desired offsets being preserved for variables, functions, and constructors.

And, provided is a computer program product for generating an output document in a user preferred style, said computer program product comprising instruction means for reading an example file representing said user preferred style into an input buffer; instruction means for searching said input buffer for a pattern that matches that of an expected section; if said pattern is found, instruction means for, from the position of said pattern, defining a first bound by searching backwards in said buffer until a previous expected search pattern is found; instruction means for, from the position of said pattern, defining a second bound by searching forwards in said buffer until a next expected search pattern is found; instruction means for copying a string of characters contained within said input buffer between said first bound and said second bound to a template buffer; instruction means for removing said string from said input buffer; instruction means for parsing said template buffer to isolate expected keywords, and names and subsections; instruction means for, if said expected section is a section that can be repeated in a document, saving in said template buffer the line offsets of keywords, names and other elements; instruction means for replacing content-specific subsections with macro names; and if said pattern is not found, instruction means for creating a default template buffer for said expected section. The computer program product may also further comprise instruction means for getting a said template buffer for each section to be generated in said output document; instruction means for getting user content for all sections of said output document; instruction means for creating an output buffer for storing said output document; for each section of said output document, instruction means for putting a corresponding template buffer into a temporary output buffer; instruction means for replacing macro names in said temporary output buffer with user content information; instruction means for, if this section is expected to be repeated and the user desires alignment, using corresponding template offsets to modify said temporary output buffer for aligning keywords, names, and other sub-sections; instruction means for inserting the content of said temporary output buffer into said output buffer; and instruction means for writing said output buffer to a file.

Further provided is a program storage device readable by a machine, tangibly embodying a program of instructions executable by a machine to perform the method steps above.

There is also provided a system for generating an output document in a user preferred style, comprising a style capture tool for examining an input document containing an example of said user preferred style to determine said user preferred style for non-functional aspects of said output document; a code generation tool for generating functional aspects of said output document; and a document generate tool responsive to said style capture tool and said code generation tool for generating said output document with said preferred style for non-functional aspects applied to the presentation of said functional aspects.

Further provided is a system for generating an output document, comprising at least one grammar template file, one said grammar template file for each of one or more sections of an output document in one or more programming languages, each said grammar template file for specifying the manner for parsing and defining the bounds of a section of said output document; and at least one style template parsed from a user example document in a user preferred style using said grammar template file for defining the style of a section of said output document.

And, there is provided a system for generating an output document in a user preferred style, comprising means for capturing the user preferred style from a user example document; and means for generating a plurality of templates, each said template representing a component of said user example document and selectively including replaceable macros. The system may further comprise means for generating functional aspects; means for replacing said macros in said template with information from said functional aspects; and means for, responsive to said template with information from said functional aspects, generating said output document.

Other features and advantages of this invention will become apparent from the following detailed description of the presently preferred embodiment of the invention, taken in conjunction with the accompanying drawings.

BRIEF DESCRIPTION OF THE DRAWINGS

The present invention is illustrated by way of example and not limitation in the figures of the accompanying drawings in which the references indicate similar or corresponding elements, and in which:

FIG. 2 illustrates a user interface display of a class declaration that was generated using the document generate tool of FIG. 1 in the style of an example document or file.

DETAILED DESCRIPTION OF THE INVENTION

In accordance with the invention, the user of a tool or other such program facility is allowed to specify the output style.

The number of possible styles is very large. One approach is to give the user a choice of a number of predefined styles, but this method can at best approximate what the user really wants. Instead, in accordance with the present invention, a method and system is provided by which a user's preferred style is determined from an example provided by the user and that determined style is used as a template for generating output documents for the user in accordance with that style. In general, style refers to the way a user formats, positions and annotates documents.

As a result, the user is provided a document generated with a style matching that of the user's preference as input by an example. The output document is not only functionally correct but also has the appearance which is desirable according to the subjective standards of the user. Consequently, the generated document is easier for the user to understand, because it is formatted in a familiar manner, in a style consistent with previous work. There is now no need for the user to spend time manually going over the document to change the style, as so often happens, for example, with programmers and generated source code, source code that is automatically created by a software application development tool.

Figure 1:
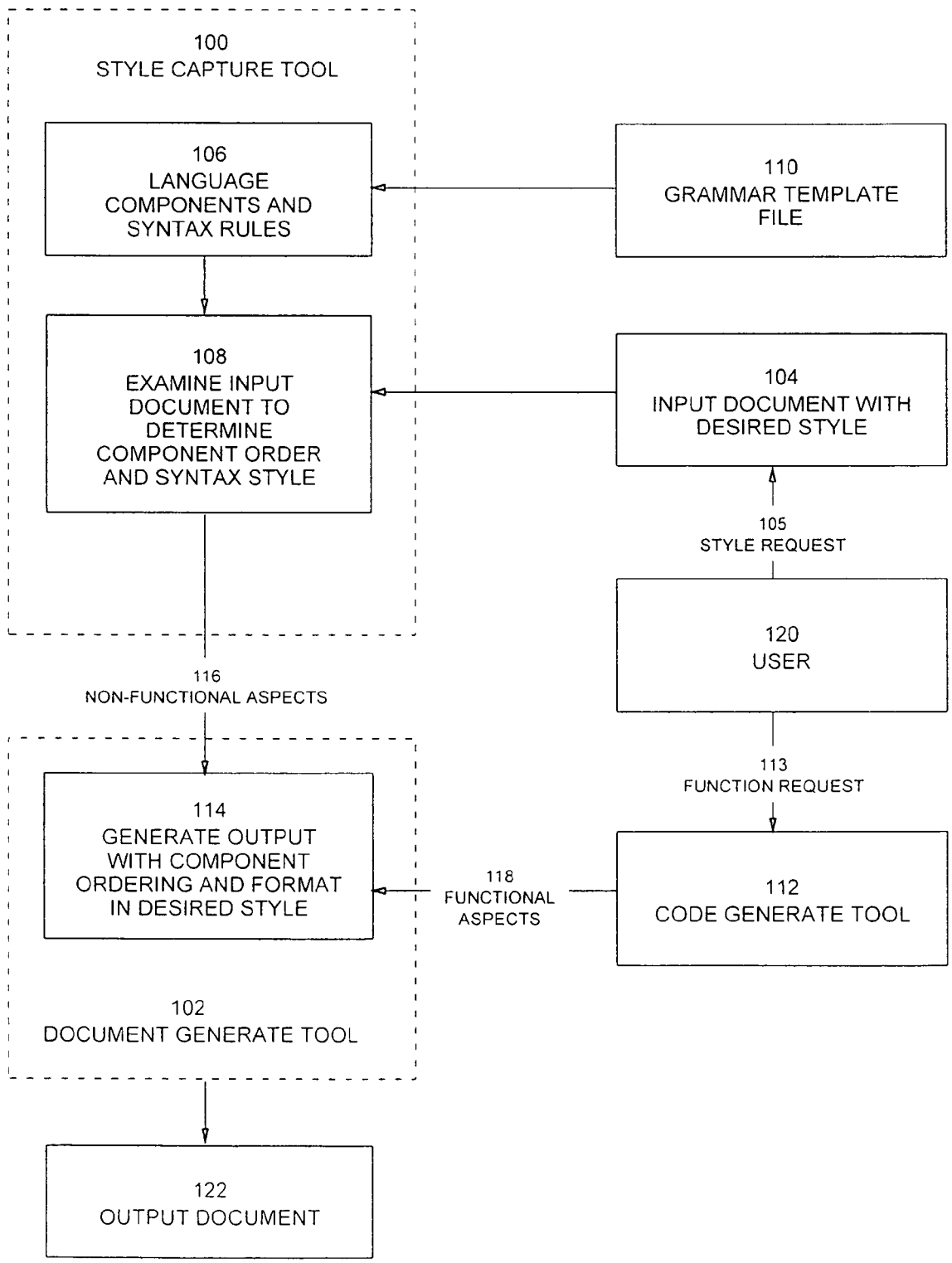
FIG. 1 illustrates the document style formatting system of the preferred embodiment of the invention.

Referring to FIG. 1, the preferred embodiment of the invention includes a style capture tool 100 and a document generate tool 102.

User 120 provides to style capture tool input document 104, which is an existing sample of some document having the desired style, and selectively, as is represented by line 113, a call to code generation tool 112 to generate or provide functional aspects 118. In block 108, style capture tool 100 examines input document 104 to determine the style that the user desires for the output document; that is, the desired format and organization, or nonfunctional aspects 116, to be applied to the functional aspects 118 generated by code generation tool 112. Style capture tool 100 will need to know how the content of this type is organized syntactically ahead of time. For example, if code generation tool 112 is generating or providing a C++ class declaration, then document generate tool 102 will need to know that user 120 desires that output document 122 be organized by having a class-head with base-specifiers, a class body, access-specifiers, member-declarations, etc. all following specific rules for format and ordering.

In accordance with a preferred embodiment of the invention, in the general solution, syntax rules are used in grammar template 110 to indicate how style capture tool 100 should go about pattern-matching for different sections of the example document. This allows use of a single implementation of the style capture tool 100 for multiple languages. Style templates are created by examining the input document 104 in step 108 and style capture tool 100 uses the syntax rules 106 to determine how to capture the style templates from input document 104. Language syntax and component order are determined in step 106 and input document 104 is expected to conform to these rules, so step 108 examines the input document 104 to create the templates 116.

These templates, which represent the non-functional, or style, aspects (as distinguished from the syntax rules) are then used by document generate tool 102 to generate in step 114 output documents 122 from functional aspects 118 in the style 116 corresponding to input or user sample document 104.

Nonfunctional style aspects 116 may include, but are not limited to, language element positioning, alignment offsets, and section order.

Style capture tool 100 may be used, for example, in a software application development environment, such as IBM Corporation's VisualAge® C++ product for generating C++ classes. In the VisualAge C++ example, code generate tool 112 and document generate tool 102 generate output documents 112 including two types of files: a declaration file (header file) and a definition file (source file). Consequently, user 120 will provide two input documents 104 to style capture tool 100, an example declaration file and an example definition file. Style capture tool 100 uses these example files 104 to capture the user's style. The use of declaration file 104 for that purpose will be further described hereafter.

In the following description, first in connection with Tables 1-5, the operation of the invention is illustrated with respect to format aspects. Second, in connection with Tables 6-9, the operation of the invention is illustrated with further respect to alignment offsets. Finally, in connection with Tables 10-13 and FIGS. 2-5, the invention is described with further respect to section order.

Capturing Style

Style capture tool 100 reads the example document into a buffer which it will use to generate 108 a number of templates 116 based on the type of input document 104. For example, to generate a template for a C++ declaration, the following sub-templates will be created: templates for the beginning of a class, first base class specifier, middle base class specifier, last base class specifier, first and last base class specifier, entering a class declaration scope, exiting a class declaration scope, access specifiers, and so forth. Each of the sub-templates represents a section, or component, of the example document 104 presented by user 120. Style capture tool 100 determines these sub-templates by dividing up the example file 104 based on syntax patterns provided by rules 106.

For example, in a style capture tool 100 provided for examining C++ code, tool 100 knows from rules 106 to look for the C++ keyword "class". When the keyword "class" is found, tool 100 then searches in the buffer containing input document 104 before and after the keyword for text that should be grouped together with the keyword to form the first declaration template. Because a programming language like C++ has comments, it is possible for the keyword "class", or any other keyword for that matter, to appear in the example document without having any syntax relevance. Style capture tool 100 deals with this situation by temporarily removing all comments from the example document 104 when searching for any syntax pattern.

When style capture tool 100 finds in step 108 a more complex structure in the example 104, for example a function declaration, it parses the declaration so that it can create a template with replaceable macros. The text for each section is copied into a template buffer that corresponds to that section of the source and then replaces text which is useful only in the context of the example, such as names, with an appropriate macro name.

For example, assume input document 104 includes the C++ source code sample illustrated in Table 1, then style capture tool 100 will execute a divide and capture procedure to generate in step 108 the collection of sub-templates with appropriate replaceable macros illustrated in Table 2.

TABLE 1

C++ SOURCE CODE SAMPLE

```
// class declaration
class MyClass: public Base1, public Base2, public Base3
{
  // public
  public:
    MyClass( );
    // a function
    void someFunction( );
  private:
  protected:
};
```

TABLE 2

RESULTING TEMPLATES

| | |
|---|---|
| Class Declaration: <CLASS_NAME>" | "\n// class declaration\nclass |
| First Base Class: | ": <ACCESS> <BASE_CLASS>," |
| Middle Base Class: | " <ACCESS> <BASE_CLASS>," |
| Last Base Class: | " <ACCESS> <BASE_CLASS>" |
| First and last base Class: | ": <ACCESS> <BASE_CLASS>" |
| Enter class scope: | "\n{" |
| Public access specifier: | "\n //public\n public:" |
| Constructor declaration: <CLASS_NAME>(<PARAMETERS>);" | "\n |
| Function Declaration: <RETURN_TYPE> <FUNCTION_NAME>(<PARAMETERS>);" | "\n// a function\n |
| ... | |
| Exit class scope: | "\n};\n" |

The "divide-and-capture" approach illustrated in Tables 1 and 2 can be done by style capture tool 100 with any type of document or programming language, given an appropriate set of rules 106.

Use in Document Generation

After style capture tool 100 captures the style of input document 104, the resulting templates 116 are provided to document generate tool 102. Document generate tool 102 first uses templates 116 from style capture tool 100 for generating output document 122 from the functional aspects 118 input from code generate tool 112. In this way, the tool 102 that generates output document 122 begins with a template for everything that needs to be generated. When it comes time to generate a specific part of document 122 from the output of code generate tool 112, document generate tool 102 replaces the macros 116, representing the language format with which it started, with the information 118 provided by code generate tool 112.

Using the C++ declaration example of Tables 1 and 2, assume that the style of function declarations in example document 104 is as illustrated in Table 3.

TABLE 3

FUNCTION DECLARATION SAMPLE function declaration = "\n// a function\n <RETURN_TYPE> <FUNCTION_NAME>(<PARAMETERS>);"

Then, assume that code generator 112 provides the functional information illustrated in Table 4. This information will be used by document generate tool 102 to replace macros 116.

TABLE 4

CODE GENERATE INFORMATION
FOR MACRO REPLACEMENT return type = "char*"
function name = "getString"
parameters = "int someIndex"

Then, Table 5 illustrates the function declaration generated by document generate tool 102.

TABLE 5

RESULTING FUNCTION DECLARATION function declaration = "\n// a function\n char* getString(int someIndex);"

The result in Table 5 is a portion of output document 122 according to the user's preferred style as provided in input document 104. This declaration (Table 5) provides one of several sections, or components, of code which for this example will be attached together to form a class declaration in output document 122.

Indentation of Sections

In accordance with a further aspect of the invention, style capture tool and document generate tools 100, 102 may be configured to allow user 120 to select more sophisticated style rules for indentation of sections. The implementation described above in connection with Tables 1-5 would indent every function based strictly on the function declaration template 116, such as is illustrated in Table 2.

In accordance with this aspect of the invention, however, user 120 may specify that each declaration generated in output document 122 look like other declarations, and that all of these output declarations 122 follow the appearance of declarations in example input document 104. For example, output document 122 using a function declaration template 116 might be as illustrated in Table 6:

TABLE 6

FUNCTION DECLARATION TEMPLATE OUTPUT SAMPLE

```
class AGeneratedOlass
{
  public:
    AGenerated Class( );
    void aFunction( );
    unsigned long anotherFunction( );
...
};
```

The declarations, "aFunction" and "anotherFunction" might be consistent with declaration template 116, but the user might want to line up the return types, names and parameters in the syntax style of Table 7.

TABLE 7

EXAMPLE USER DESIRED OUTPUT STYLE

```
class AGeneratedClass
{
  public:
    AGeneratedClass              ( );
    Void
    aFunction                    ( );
    unsigned long
    anotherFunction              ( );
    ...
};
```

In order to accommodate such an appearance, style capture tool 100 is configured as it parses constructor and function declarations in step 108 to calculate the following offsets: the offset of the function name from the start of the line it is on, and the offset of the parameters from the start of the line. Because the return type, function name and parameters will all be replaced with macros 118 in style capture tool 100, these offsets are the only thing that can preserve the way functions are lined up. For example, assume input document 104 includes material organized according to the syntax illustrated in Table 8.

TABLE 8

OFFSET ALIGNED PARAMETERS

```
class someClass
{
  public:
  ...
                      someClass       ( );
         int          aFunction       ( );
};
```

Input document 104 includes information organized so that the return types, function names and parameters line up. Templates 116 created without regard for the alignment syntax, as will be the case when created without reference to the offsets calculated to preserve relative indentation, may be as illustrated in Table 9.

TABLE 9

RESULTING TEMPLATE ALIGNMENT EXAMPLE

```
Constructor:         "\n
  <CLASS_NAME>                (<PARAMETERS>);"
```

TABLE 9-continued

RESULTING TEMPLATE ALIGNMENT EXAMPLE

| Function: | "\n | <RETURN_TYPE> |
| <FUNCTION_NAME> | | (<PARAMETERS>);" |

In accordance with this aspect of the invention, offsets calculated to preserve the relative indentation between declaration templates are stored with the declaration templates for later use in document generate tool 102.

Document generate tool 102 uses the offsets stored with templates 116 as follows. When a function declaration 118 is to be formatted by document generate tool 102, the appropriate function declaration template 116 from the style capture tool 100 is examined to obtain the function name offset and the function parameter offset. These are referred to as the user desired offsets. These offsets are created by looking at the templates. The offsets are numbers representing the positioning, while the templates are strings that include white-space. The offsets are only used when using the document generate tool 102.

Document generate tool 102 examines templates 116 to determine actual offsets. These actual offsets are then compared to the desired offsets. If each pair of offsets is the same, then the declaration generated from template 116 is left as is. If a desired offset is greater than an actual offset, then white space is inserted into the generated declaration so that the offsets match. Otherwise, if a desired offset is less than an actual one, white-space is removed.

This method of preserving declaration indentation is used for variables, functions and constructors (any member of a class).

The preceding approach for aligning each section assumes that the user wants to use offsets that are fixed based on the example document. If the content of a section is too big to be nicely aligned within the offset bounds, then this section is not aligned with other sections. Instead, the section is allowed to overlap the bounds and the next offset is moved the difference. Alternatively, when the content of a section is too big to be nicely aligned within the offset bounds, the largest required offset for each type of offset may be determined for the content, and the offset set to be the larger of the initial offset (based on the example) and the largest required (based on the content).

Ordering of Sections

In a class declaration, the way that a user orders members of a particular access is arbitrary and therefore a question of style. There are three types of member access: public, protected and private. In accordance with this aspect of the invention, in step 108 when style capture tool 100 examines a user's source input file 104, it determines the section order and stores that information with the templates and the offsets. Document generate tool 102 uses this information to decide the order in which to output generated members in output document 122.

Example of Usage

An example of the invention for generating an output document 122 which orders access according to the style of input document 104 is described below with respect to IBM's VisualAge C++ software application development environment.

Table 10 illustrates a class declaration that has been created using document generate tool 102 from input 118 in the style of the example file 104 illustrated in Table 11. In this case, example file 104 is an existing, or previously entered, example file and may not represent the style desired by the current user.

TABLE 10

EXAMPLE CLASS DECLARATION
(See FIG. 2)

```
//////////////////////
//
//   MyFrameWindow
//
//////////////////////
class MyFrameWindow : public IFrameWindow
   , public IFrameHandler
   , public ICommandHandler
   , public IMenuHandler
{
   public:
      MyFrameWindow( );
      IColor backgroundColor( ) const;
      int get_aVariable( );
      void set_aVariable(int value);
   protected:
      IWindowHandle create(unsigned long id, const char * title,
```

TABLE 11

Figure 3:
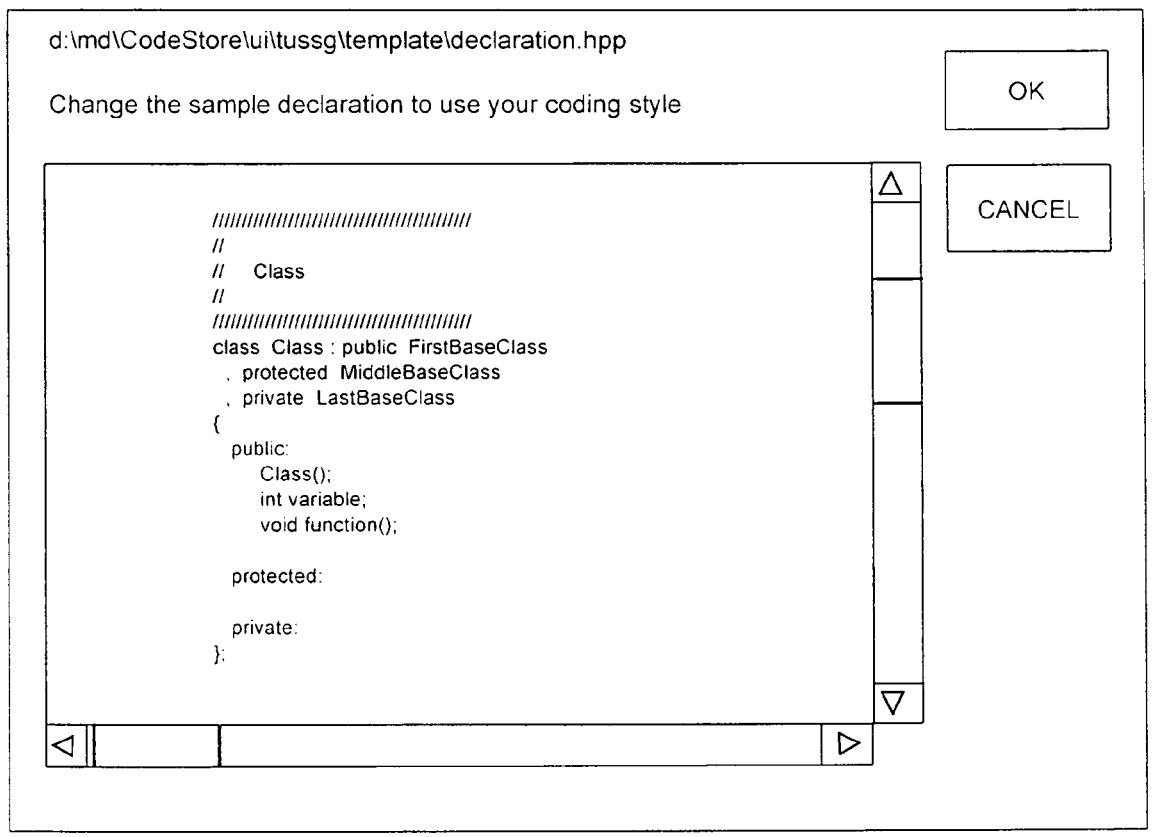
FIG. 3 illustrates a user interface display of the example file or document from which the class declaration of FIG. 2 was generated.

EXAMPLE FILE
(See FIG. 3)

```
//////////////////////
//
//   Class
//
//////////////////////
class Class: public FirstBaseClass
   , protected MiddleBaseClass
   , private LastBaseClass
{
   public:
      Class( );
      int variable
      void function( );
   protected:
   private:
};
```

In accordance with this aspect of the invention, the user is enabled to change the style to match a preferred style. The user could either modify the example file 104 displayed in FIG. 2, or replace the example declaration file 104, either way providing input document 104 with the style illustrated in Table 12.

TABLE 12

Figure 4:
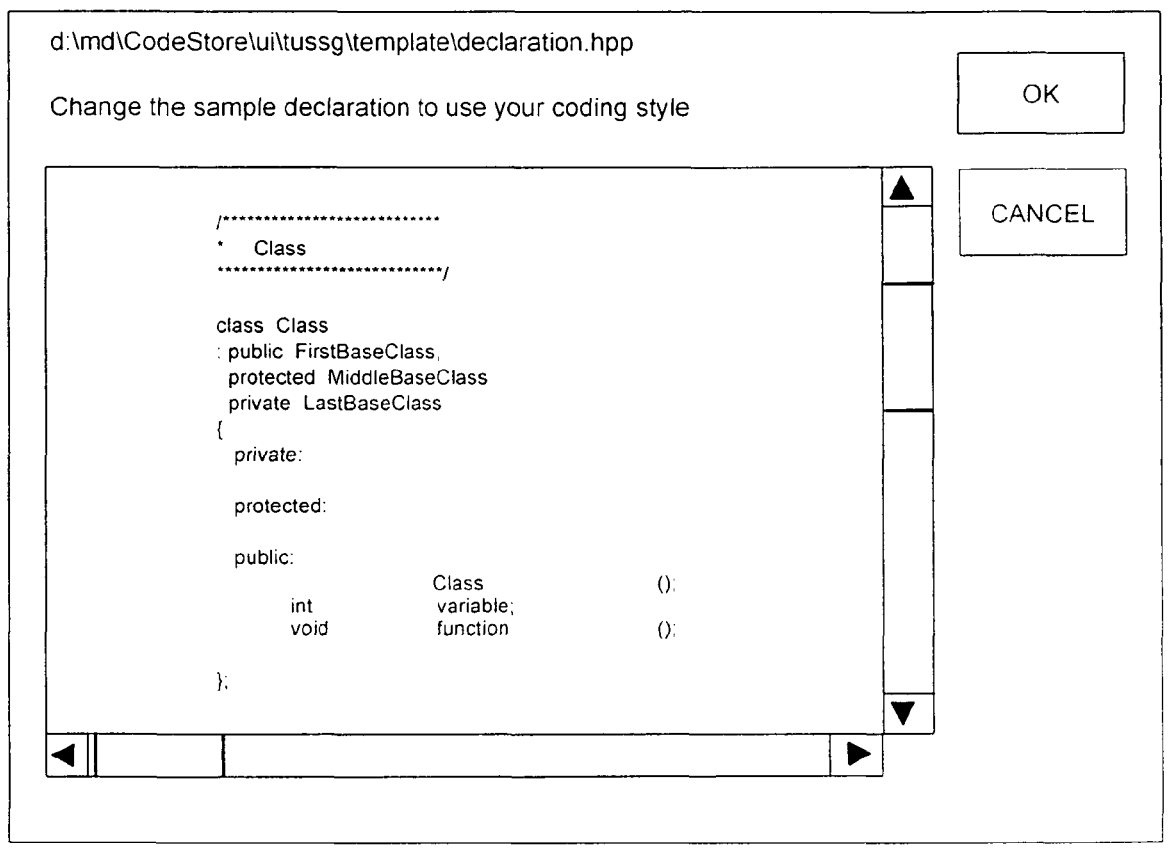
FIG. 4 illustrates a user interface display of a modified or replacement file or document input by a user to modify the style of an output document.

EXAMPLE USER DESIRED STYLE
(See FIG. 4)

```
/*********************
 * Class
 *********************/
class Class
  : public FirstBaseClass,
    protected MiddleBaseClass,
    private LastBaseClass
{
   private:
   protected:
   public:
```

TABLE 12-continued

EXAMPLE USER DESIRED STYLE
(See FIG. 4)

```
              Class
    int       variable;              ( );
    void      function               ( );
};
```

The input documents 104 of Tables 11 and 12 provide examples of different commenting style, different styles for base class specifiers, different order for member access and different indentation styles for function declarations. The example file 104 of Table 12 results in generating an output document 122 of the style of Table 13.

TABLE 13

Figure 5:
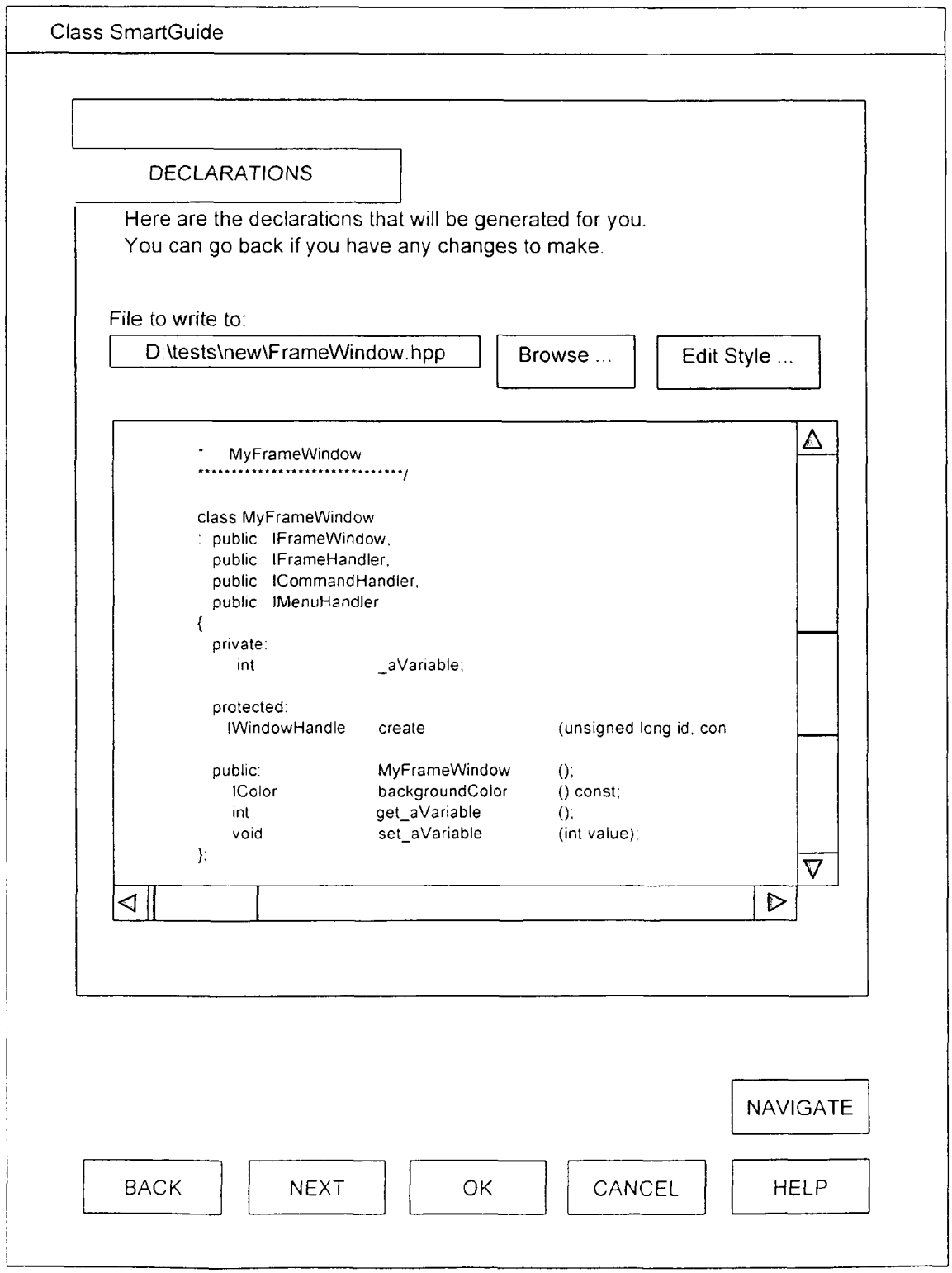
FIG. 5 illustrates a user interface display of an output document of a style corresponding to that of the example file or document of FIG. 4.

RESULTING FILE IN USER DESIRED STYLE
(See FIG. 5)

```
* MyFrameWindow
********************/
class MyFrameWindow
: public IFrameWindow,
    public IFrameHandler,
    public ICommandHandler,
    public IMenuHandler
{
    private:
        int                 _aVariable;
    protected:
        lWindowHandle create              (unsigned long id, con
    public:
                        MyFrameWindow   ( );
        IColor          backgroundColor ( ) const;
        int             get_aVariable   ( );
        void            set_aVariable   (int value);
};
```

Generalized Implementation

The previous example illustrated an embodiment of the invention for generating a specific type of document (C++ declarations). Table 14 is a pseudo-code rendition of style capture tool 100, and Table 15 is a pseudo-code rendition for document generate tool 102 using the templates generated by the style capture tool 100, in accordance with a general implementation of the invention.

Style capture tool 100 may also be produced in a more general way, applicable to all types of documents. In this general implementation, a special type of template file, grammar template file 110, is used to specify how style capture tool 100 is to look for and determine the bounds of each section in the example style document 104 as well as other information about the syntactic use of a section. Each grammar template file 110 tells tool 100 what to look for in a specific language or document type.

This file 110 contains "grammar templates" for each section of a document. When example input document 104 is used for capturing style, each "grammar template" 110 is used to find, from the example document, a section of the document which will be used to create a corresponding "style template" 116. In each grammar template 110, there is provided information such as the following:

1. A unique identifier for the section

2. A unique "external" pattern used to find a particular type of document section.

3. An "internal" pattern to be used after the "external" pattern is found. This pattern indicates the kinds of elements that are to be considered part of the current section.

4. A pattern used to indicate what should come before this section. For example, this might be anything that is not whitespace, or a pattern that represents the end of another section.

5. A pattern used to indicate what should come after this section. For example, this might be anything that is not whitespace, or a pattern that represents the beginning of another section.

6. An indication of whether this section is repeatable. If it is, then when a style template for the section is created, alignment offsets need to be calculated. When capturing style, an offset template for each required subsection of the syntax template is created.

7. An indication of whether this section is part of a group of unique sections and, if it is, whether the order of these sections matters syntactically. If it is part of a group of sections that are order independent, the identifiers for each of the other sections need to be indicated so that the style capture tool can capture the order of these sections from the input file. When looking through sections of the example document 104 that are parts of groups, the style capture tool 100 determines their order and stores ordering information for each of these types of sections.

The template file 110 containing language syntax is interpreted by style capture tool 100 before any style templates 116 are created. Then this information is used by style capture tool 100 for finding sections in the example document 104 that will be used for creating style templates 116. Style capture tool 100 iterates through each grammar template 110 to create each associated style template 116. Because each created style template 116 is stored and associated with a unique grammar template 110, each may be found by querying the grammar template's external pattern.

In the generalized solution of this preferred embodiment, a specialized document generate tool 102 extracts each style template 116 from the style capture tool 100 that is appropriate for a specific document section to be generated. Document generator 102 gets this style template by using an appropriate syntax pattern (one that matches the external pattern of a grammar template) of the section in a query to get the matching style template from the style capture tool 100.

TABLE 14

STYLE CAPTURE TOOL 100

```
read and parse the given grammar file to determine each grammar template
read example style document into an input buffer
for (each grammar template (expected section) of the input buffer)
    //      style capture tool knows ahead of time what it is looking for
    {
    find all annotations (comments) and temporarily remove them from
    the input buffer - replace them with white-space
    search the input buffer for a pattern that matches the external pattern of
    the current grammar template
    //      each expected section will be identifiable by a pattern
    if (the pattern is found)
    {
        from the position of the found pattern, search backwards in the buffer
        until the previous pattern (attribute 4 of the current grammar template)
        is
        matched from the position of the found pattern, search forwards in the
        buffer until the next pattern (attribute 5 of the current grammar tem-
        plate)
        is matched restore any comments that have been removed from the
    input
        buffer copy the string contained in the recently computed bounds to the
```

TABLE 14-continued

STYLE CAPTURE TOOL 100

```
    template buffer that is used for this particular part of the document and
    associate this style template with the current grammar template
    remove the string mentioned above from the input buffer
    parse the template buffer to isolate expected keywords, names and other
    subsections using the internal pattern of the grammar template
    if (the expected section is a section that can be repeated in a document
    (grammar template attribute 6))
        // for example, a function declaration
        {
            save the offsets of the keywords, names and other elements in the
            template buffer relative to the beginning of the line that each appears
            on and store these offsets with the template buffer
        }
        replace any names or other content-specific subsections (strings that
        specify user content) with macro names (these names will be used later
        by the document generator to insert user content)
        if (the expected section is a section that is part of an order-independent
        group (grammar template attribute 7))
        {
            keep track of the order which this section appears in relative to the
            other sections of this group
        }
    }
    else    // the pattern is not found
    {
        restore any annotations (comments) that have been removed from
        the input buffer
        create default style template buffer for expected section; base the
        default style template buffer on the grammar template internal pattern
    }
}
```

TABLE 15

DOCUMENT GENERATE TOOL 102

```
get document template from style capture tool
get all content for document to be generated
    // either from existing content or from the user
create an output buffer for storing the new document
for (each section of document that is to be generated)
{
    find the corresponding style template from the style capture tool and put
    it in a temporary buffer. This can be done by passing to the style capture
    tool a pattern that matches that of the external pattern of a grammar
    template. Having found the grammar template, the corresponding style
    template is returned.
    replace the macro names of the buffer with the user content
    if (this section is expected to be repeated (attribute 6 of the grammar
    template) and the user wants to align text)
    {
        use the corresponding template offsets to modify the temporary
        buffer for aligning keywords, names and other sub-sections
    }
    insert the temporary buffer content into the output buffer
}
write the output buffer to a file
```

The detailed descriptions may have been presented in terms of program procedures and methods executed on a computer or network of computers. These descriptions and representations of program procedures and methods are the means used by those skilled in the art to most effectively convey the substance of their work to others skilled in the art. They may be implemented in hardware or software, or a combination of the two.

A program method and/or procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, objects, attributes or the like. It should be noted, however, that all of these and similar terms are to be associated with the appropriate physical quantities and are merely convenient labels applied to these quantities.

Further, the manipulations performed are often referred to in terms, such as adding or is comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or similar devices.

Each step of the method may be executed on any general computer, such as a mainframe computer, personal computer or the like and pursuant to one or more, or a part of one or more, program modules or objects generated from any programming language, such as C++, Java, Fortran or the like. And still further, each step, or a file or object or the like implementing each step, may be executed by special purpose hardware or a circuit module designed for that purpose.

In the case of diagrams depicted herein, they are provided by way of example. There may be variations to these diagrams or the steps (or operations) described herein without departing from the spirit of the invention. For instance, in certain cases, the steps may be performed in differing order, or objects, classes and steps may be added, deleted or modified. All of these variations are considered to comprise part of the present invention as recited in the appended claims.

While the preferred embodiment of this invention has been described in relation to the C++ language, this invention need not be solely implemented using the C++ language. It will be apparent to those skilled in the art that the invention may equally be implemented in other computer languages, such as object oriented languages like Java and Smalltalk. In any case, the language may be a compiled, interpreted or other form of computer programming language.

The invention is preferably implemented in a high level procedural or object-oriented programming language to communicate with a computer. However, the invention can be implemented in assembly or machine language, if desired.

The invention may be implemented as an article of manufacture comprising a computer usable medium having computer readable program code means therein for executing the method steps of the invention, a program storage device readable by a machine, tangibly embodying a program of instructions executable by a machine to perform the method steps of the invention, or a computer program product. Such an article of manufacture, program storage device or computer program product may include CD-ROMs, diskettes, tapes, hard drives, computer RAM or ROM.

The invention may also be implemented in a system. A system may comprise a computer that includes a processor and a memory device and optionally, a storage device, an output device such as a video display and/or an input device such as a keyboard or computer mouse. Moreover, a system may comprise an interconnected network of computers. Computers may equally be in stand-alone form (such as the traditional desktop personal computer) or integrated into another apparatus (such a cellular telephone). The system may be specially constructed for the required purposes to perform, for example, the method steps of the invention or it may comprise one or more general purpose computers as selectively activated or reconfigured by a computer program in accordance with the teachings herein stored in the computer(s). The procedures presented herein are not inherently related to a particular computer system or other apparatus. The required structure for a variety of these systems will appear from the description given.

While this invention has been described in relation to preferred embodiments, it will be understood by those skilled in the art that changes in the details of processes and structures may be made without departing from the spirit and scope of this invention. Many modifications and variations are possible in light of the above teaching. Thus, it should be understood that the above described embodiments have been provided by way of example rather than as a limitation and that the specification and drawings are, accordingly, to be regarded in an illustrative rather than a restrictive sense.

The embodiments of the invention in which an exclusive property or privilege is claimed are defined as follows:

1. A computer program product embodied in a computer readable medium for generating an output document, said computer program product comprising:
   at least one grammar template file, one said grammar template file for each of one or more sections of an output document in one or more programming languages, each said grammar template file for specifying the manner for parsing and defining the bounds of a section of said output document;
   at least one style template parsed from a user example document in a user preferred style using said grammar template file for defining the style of a section of said output document;
   a syntax template for finding and extracting style information for each section of said user example document and including a section identifier, an external pattern, an internal pattern, a before pattern, an after pattern, a repeatability indicator, and an ordering indicator; each said syntax template being associated with a single style template;
   said section identifier for identifying a section of said output document;
   said external pattern for finding a particular section in said input document;
   said internal pattern for indicating the textual elements to be considered as part of said particular section;
   said before pattern for indicating what should come before said particular section;
   said after pattern for indicating what should come after said particular section;
   said repeatability indicator for indicating whether said particular section is a repeatable section and, if so, that alignment offsets need to be calculated; and
   said ordering indicator for indicating if said particular section is part of a group of unique sections and, if so, whether the ordering of said group of unique sections is independent or whether the ordering of said group must be captured from said user example document.

2. A method for generating an output document, the method comprising:
   using at least one grammar template file, one said grammar template file for each of one or more sections of an output document in one or more programming languages, each said grammar template file for specifying the manner for parsing and defining the bounds of a section of said output document;
   using at least one style template parsed from a user example document in a user preferred style using said grammar template file for defining the style of a section of said output document;
   using a syntax template for finding and extracting style information for each section of said user example document and including a section identifier, an external pattern, an internal pattern, a before pattern, an after pattern, a repeatability indicator, and an ordering indicator; each said syntax template being associated with a single style template;
   using said section identifier for identifying a section of said output document;
   using said external pattern for finding a particular section in said input document;
   using said internal pattern for indicating the textual elements to be considered as part of said particular section;
   using said before pattern for indicating what should come before said particular section;
   using said after pattern for indicating what should come after said particular section;
   using said repeatability indicator for indicating whether said particular section is a repeatable section and, if so, that alignment offsets need to be calculated; and
   using said ordering indicator for indicating if said particular section is part of a group of unique sections and, if so, whether the ordering of said group of unique sections is independent or whether the ordering of said group must be captured from said user example document.

3. A system, comprising:
   a memory unit for storing a computer program for generating an output document; and
   a processor coupled to said memory unit, wherein said processor, responsive to said computer program, comprises:
      circuitry for implementing at least one grammar template file, one said grammar template file for each of one or more sections of an output document in one or more programming languages, each said grammar template file for specifying the manner for parsing and defining the bounds of a section of said output document;
      circuitry for implementing at least one style template parsed from a user example document in a user preferred style using said grammar template file for defining the style of a section of said output document;
      circuitry for implementing a syntax template for finding and extracting style information for each section of said user example document and including a section identifier, an external pattern, an internal pattern, a before pattern, an after pattern, a repeatability indicator, and an ordering indicator; each said syntax template being associated with a single style template;
      circuitry for implementing said section identifier for identifying a section of said output document;
      circuitry for implementing said external pattern for finding a particular section in said input document;
      circuitry for implementing said internal pattern for indicating the textual elements to be considered as part of said particular section;
      circuitry for implementing said before pattern for indicating what should come before said particular section;
      circuitry for implementing said after pattern for indicating what should come after said particular section;

circuitry for implementing said repeatability indicator for indicating whether said particular section is a repeatable section and, if so, that alignment offsets need to be calculated; and circuitry for implementing said ordering indicator for indicating if said particular section is part of a group of unique sections and, if so, whether the ordering of said group of unique sections is independent or whether the ordering of said group must be captured from said user example document.

* * * * *